(12) United States Patent
Harsham et al.

(10) Patent No.: US 9,196,246 B2
(45) Date of Patent: Nov. 24, 2015

(54) DETERMINING WORD SEQUENCE CONSTRAINTS FOR LOW COGNITIVE SPEECH RECOGNITION

(71) Applicant: Mitsubishi Electric Research Laboratories, Inc., Cambridge, MA (US)

(72) Inventors: Bret Harsham, Newton, MA (US); John Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/337,472

(22) Filed: Jul. 22, 2014

(65) Prior Publication Data

US 2014/0372122 A1  Dec. 18, 2014

Related U.S. Application Data

(63) Continuation-in-part of application No. 13/917,884, filed on Jun. 14, 2013.

(51) Int. Cl.
| | | |
|---|---|---|
| *G10L 15/18* | (2013.01) | |
| *G10L 15/183* | (2013.01) | |
| *G10L 15/22* | (2006.01) | |
| *G06F 3/16* | (2006.01) | |
| *G06F 3/0488* | (2013.01) | |
| *G10L 15/08* | (2006.01) | |

(52) U.S. Cl.
CPC .......... *G10L 15/183* (2013.01); *G06F 3/04883* (2013.01); *G06F 3/04886* (2013.01); *G06F 3/16* (2013.01); *G10L 15/22* (2013.01); *G06F 2203/0381* (2013.01); *G10L 2015/088* (2013.01); *G10L 2015/228* (2013.01)

(58) Field of Classification Search
CPC ..... G06F 3/017; G06F 3/011; G06F 3/04883; G06F 3/012; G06F 3/013; G06F 3/0488; G06F 3/014; G06F 3/016; G06F 3/033; G06F 2203/0331; G06F 3/03545; G06F 3/03547; G06F 3/0481; G06F 2203/04104; G06F 2203/04106; G10L 15/24; G10L 15/00; G10L 15/183; G10L 15/193; G10L 15/32; G10L 17/00; G10L 15/08; G10L 15/19; G10L 2015/227; G10L 2015/228
USPC ......... 704/231, 235, 251, 254, 255, 257, 243, 704/244, 250, 272, 1–10, 270
See application file for complete search history.

(56) References Cited

U.S. PATENT DOCUMENTS

| | | |
|---|---|---|
| 5,960,447 A | 9/1999 | Holt |
| 5,970,460 A | 10/1999 | Bunce |
| 6,064,959 A | 5/2000 | Young |
| 6,868,383 B1 * | 3/2005 | Bangalore et al. ............ 704/254 |
| 7,444,286 B2 | 10/2008 | Roth |
| 2006/0293889 A1 | 12/2006 | Kiss |
| 2009/0055174 A1 * | 2/2009 | Han et al. ...................... 704/235 |
| 2011/0313768 A1 * | 12/2011 | Klein et al. ................... 704/251 |

* cited by examiner

*Primary Examiner* — Huyen Vo

(74) *Attorney, Agent, or Firm* — Dirk Brinkman; Gene Vinokur

(57) ABSTRACT

A method for recognizing speech including a sequence of words determines a shape of a gesture and a location of the gesture with respect to a display device showing a set of interpretations of the speech. The method determines a type of the word sequence constraint based on the shape of the gesture and determines a value of the word sequence constraint based on the location of the gesture. Next, the speech is recognized using the word sequence constraint.

20 Claims, 16 Drawing Sheets

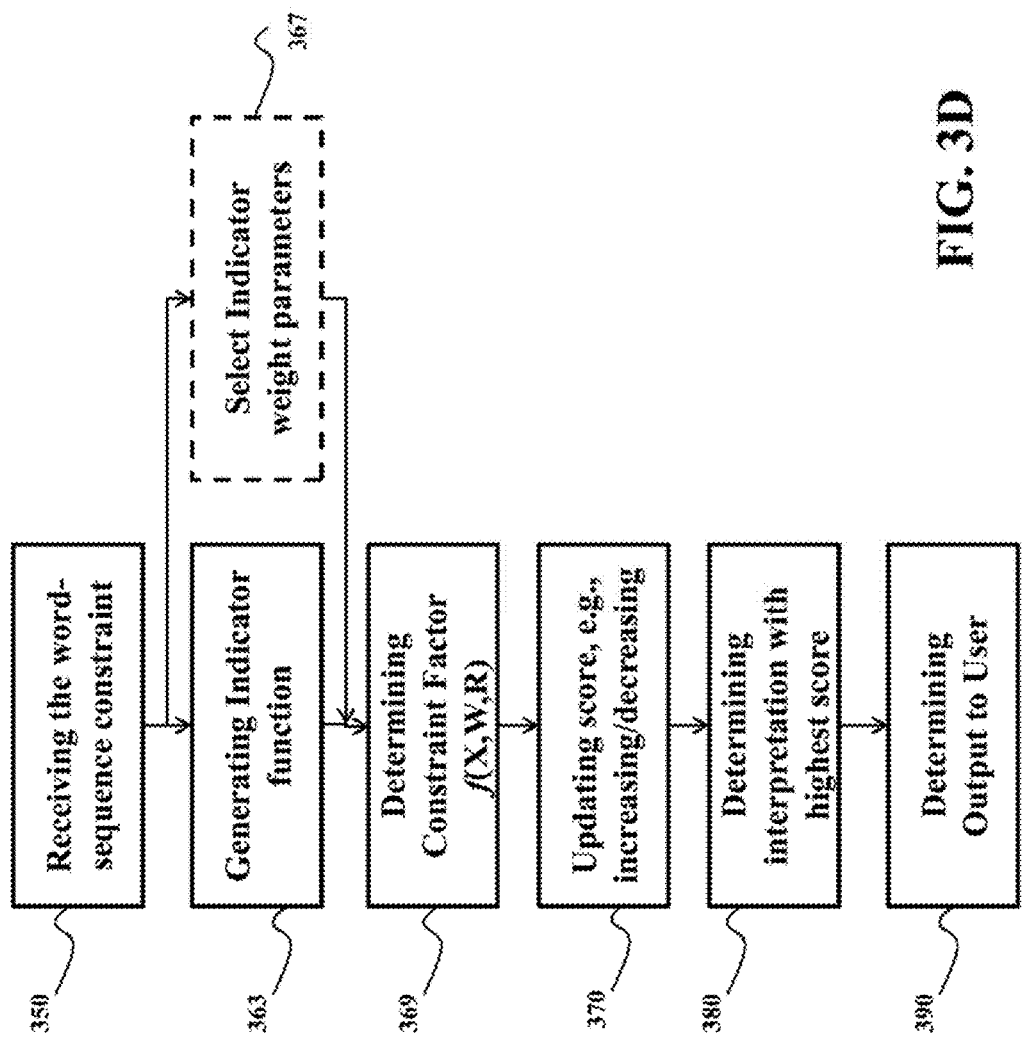

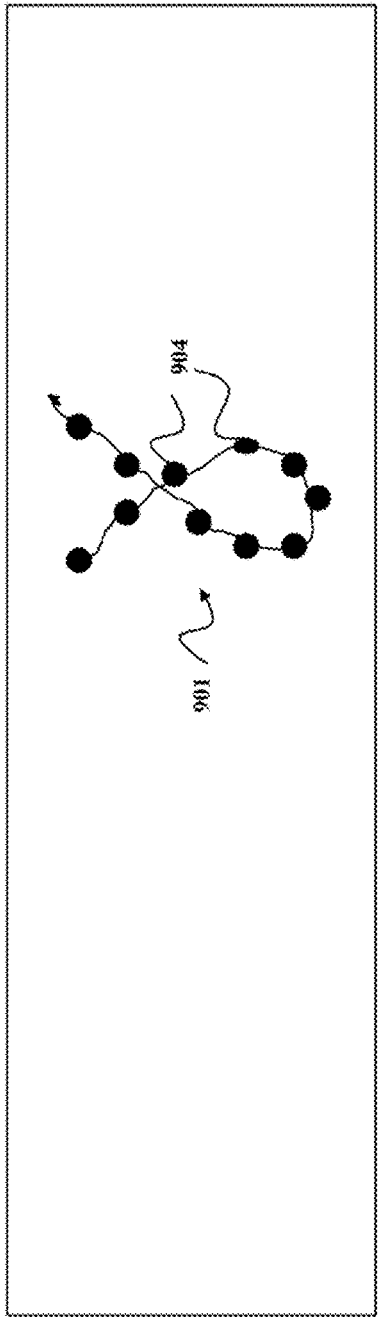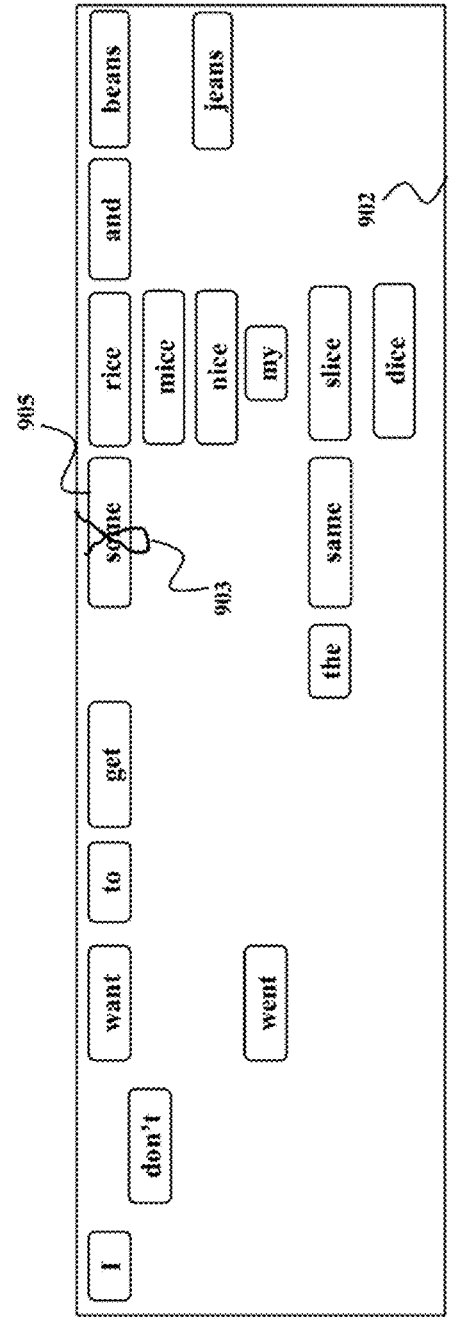
FIG. 9 A
FIG. 9 B

DETERMINING WORD SEQUENCE CONSTRAINTS FOR LOW COGNITIVE SPEECH RECOGNITION

RELATED APPLICATIONS

This application is a continuation-in-part of U.S. patent application Ser. No. 13/917,884 submitted by Harsham et al. on Jun. 14, 2013 for "System and Method for Recognizing Speech."

FIELD OF THE INVENTION

The present invention relates generally to automatic speech recognition, and more particularly to providing the speech recognition while placing low cognitive load on a user.

BACKGROUND OF THE INVENTION

It is generally known that any non-driving-related task performed by a driver can be a distraction from driving. Because of this, there has been a recent focus on reducing the use of mobile telephones while driving, both by legislative means and by driver education. There has also been an increasing demand for driver access to information, communication, and entertainment functions in the vehicle.

Studies have shown that speech-based interfaces can be less distracting than conventional visual or manual interfaces. Command-based speech interfaces for limited functions are becoming common in vehicles. However, text entry using speech for such functions as SMS is difficult because recognition of a large-vocabulary continuous speech is prone to errors. Thus, there is a need for correcting or otherwise changing text that has been input using speech while reducing distraction on the part of a user while driving.

Some methods for correcting unrestricted speech utilize editing applications, i.e., word processors with computer displays and conventional keyboards. For example, the method, described in U.S. Pat. No. 5,960,447, corrects misrecognitions of speech by tagging words in the recognized text with associated speech and allowing users of word processing software to listen to the speech for editing text transcriptions.

Another method, described in U.S. Pat. No. 5,970,460 improves editing operations by associating a "speech event database" with positions in a text transcription in an editing application program and widening the context. Such methods require primary attention to the correction task including conventional keyboard, mice, and menu selection and, particularly, drawing upon visual resources necessary to attend to visual displays. However, the use of keyboards, touchscreen, and large visual displays do not minimize distractions from driving.

Other methods minimize complexity of interaction by using subsequent speech to edit the transcription resulting from a first speech. For example, a method described in U.S. Pat. No. 6,064,959 corrects result of the speech recognition using the subsequent utterance. Similarly, the method described in U.S. Pat. No. 7,444,286 selects portions of the speech recognition to be re-recognized. However, the subsequent interpretation of the speech can produce errors, resulting in increased the error correction efforts, and further contributing to driver distraction.

Another method described in U.S. 2006/293,889 uses corrections of a single word given by the user to adjust the alternative suggestions for words adjacent to that single word. However, if multiple words in the speech of the user are interpreted incorrectly, the user has to correct the speech interpretation multiple times. Moreover, the corrections of this method are limited to replacement of the selected word, as opposed to more general types of interactions, which may lead to further distractions for the user. Therefore there is a need to minimize the interactions and user attention necessary to guide the interpretation of speech.

SUMMARY OF THE INVENTION

Some embodiments of the invention are based on a realization that errors that occur in speech recognition of large-vocabulary continuous speech including a sequence of words are often associated with other errors. Therefore, a correction to the recognition result can be used to predict where other errors might have occurred and to correct the additional errors, instead of just correcting the initial error and waiting for additional user input. These other errors may occur in adjacent word locations, or they may occur in more distant locations without any changes needed to adjacent words, thus the correction should be used to update the recognition result. Thus, the correction constraint can then be used to re-interpret the speech uttered by a user.

Such constraints can improve the probability of correctly interpreting group of words, as contrasted with an interpretation that only uses the acoustic signals corresponding to the individual words. For example, given a recognition result including alternates "Wreck a nice beach" and "Recognize speech", a constraint that the topic is "pollution" can be used to update the probabilities of the first recognition.

For example, instead of asking the user to correct a specific word or words of the interpretation of the speech, an input from the user can be used to determine the word sequence constraints, which can be used to update the entire interpretation of the speech. This realization allows reducing an effort of the user to correct the speech, because the word sequence constraints can lead to the correction of the entire interpretation of the speech, while the correction of the word can lead to the correction of that word only.

For example, in some embodiments, the word-sequence constraints include metadata of the speech, such as a number of words in the speech or the absence of a specific word in the speech. In another embodiment, the word-sequence constraints are more specific to the context of the speech. For example, the word-sequence constraints can include information about initial interpretation of the speech, and such information is used to re-evaluate the interpretation of the entire speech.

Some embodiments are also based on recognition that in order for the system to impose a low cognitive load on a user, the method(s) of entry of word sequence constraints should minimize the actions of the user required for selection of the constraints. The word-sequence constraints can have different values, but also can have different types. For example, the types of the word-sequence constraints can include selection or rejection of a word, selection of the sequence of word, selection of a timeslot, a trace of correct words in the sequence, replacement of words or order of words, etc. Accordingly, it is desired to provide an interface adapted for selection of both type and value of the constraints with minimal destruction of the users from their primary task, such as driving.

Some embodiments of the invention are based on a realization that a single gesture of the user can be analyzed to determine both the type and the value of the word-sequence constraints. Specifically, a shape of the gesture can be used to determine a type of the word-sequence constraint, and a location of the gesture with respect to the interface, e.g., a location of the gesture path as mapped to the coordinate space of the user interface (and possibly as displayed on an output device), can be used to determine the value of the word-sequence constraint.

For example, a horizontal gesture can be mapped to the type of the word-sequence constraint of selecting a sequence of words. The location of the path of this gesture on the display device can be used to determine the sequence of words present in the interpretation of the speech. Similarly, a vertical gesture can be mapped to the type of selecting a timeslot of the words, and the location of the path of this gesture on the display device can be used to determine time and/or order of utterance of the specific words. In a similar manner, different shapes of gestures like flick, circle, drag selection and trace of the word path can be mapped to the different types of constraints and the location of the gesture on the display device can be used to determine the value of the constraint for subsequent rescoring of the possible interpretations of the speech.

Accordingly, one embodiment of the invention discloses a method for recognizing speech including a sequence of words. The method includes determining a shape of a gesture and a location of the gesture with respect to a display device showing a set of interpretations of the speech; determining a type of the word sequence constraint based on the shape of the gesture and a mapping between a set of shapes of gestures and a set of types of word sequence constraint; determining a value of the word sequence constraint based on the location of the gesture; and recognizing the speech using the word sequence constraint. The steps of the method are performed by a processor.

Another embodiment discloses a system for recognizing speech including a sequence of words including a display device for displaying a set of interpretations of the speech, and for receiving, in response to the displaying, a gesture with respect to the display device; and at least one processor for determining a type and a value of a word sequence constraint based on a shape of the gesture and a location of the gesture relative to locations of elements from the set of interpretations on the display device and for recognizing the speech using the word sequence constraint.

BRIEF DESCRIPTION OF THE DRAWINGS

FIGS. 3A, 3B, 3C and 3D are flowcharts of the steps performed by methods for error correction in speech recognition according to various embodiments of the invention;

FIG. 9A is a diagram of an exemplar shape of a gesture represented by a sequence of coordinate locations in the space of the input device;

FIG. 9B is a diagram of a location of a gesture with respect to a display device represented by the location of the gesture in the coordinate space of the display device.

DETAILED DESCRIPTION OF PREFERRED EMBODIMENT

Figure 1A:
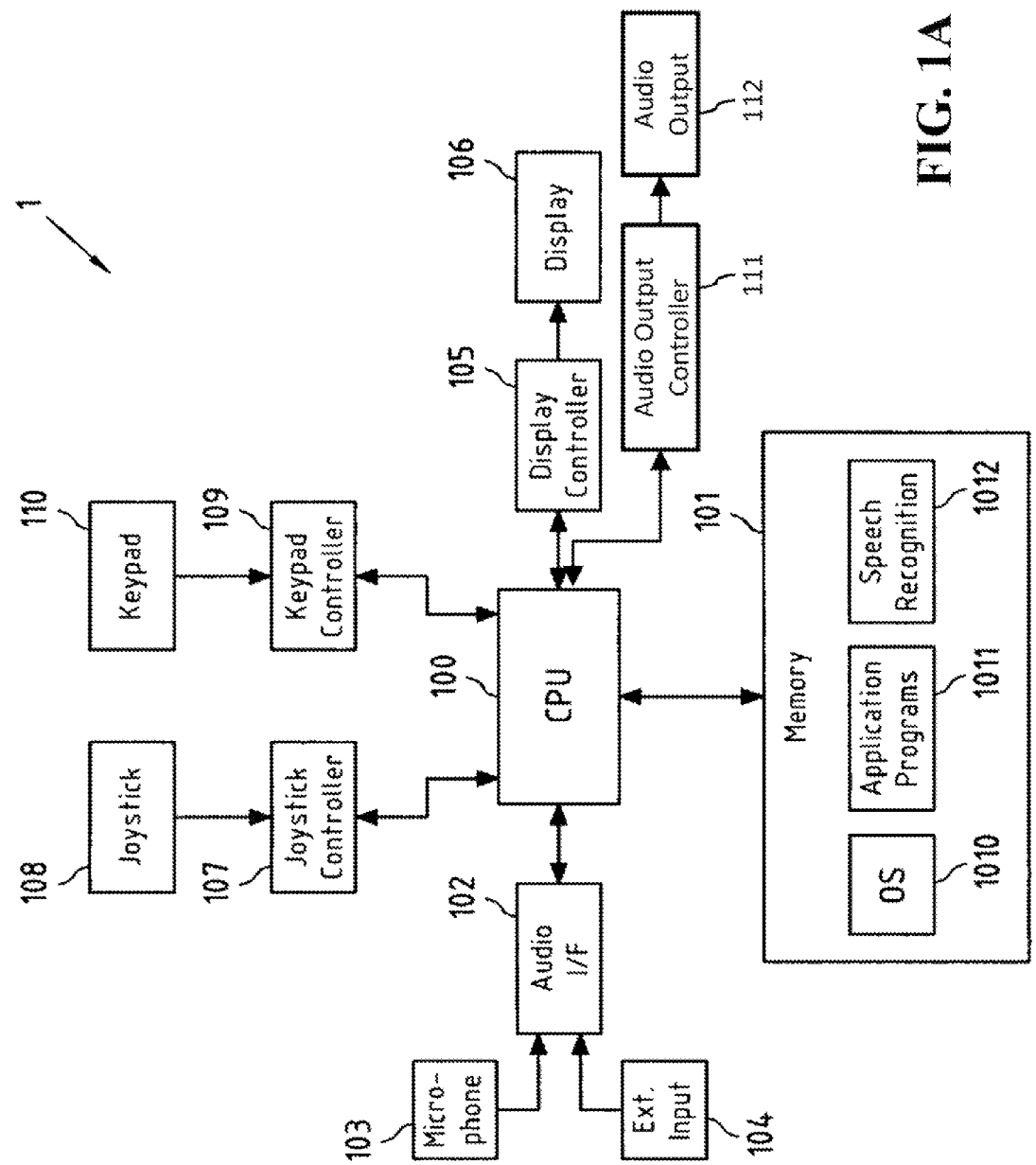
FIG. 1A is a schematic of components of a system for speech recognition according to one embodiment of the invention.

FIG. 1A shows an example of a system 1 capable of implementing a method for recognizing speech while minimizing a cognitive load on a user uttering the speech according to some embodiments of the invention.

The system 1 includes a central processing unit (CPU) 100, which controls the operation of the entire system. The system 1 interacts with a memory 101, which comprises, software related to an operating system (OS) 1010 of the system, application programs 1011 that can be executed by the CPU 100 to provide specific functionalities to a user of the system, such as dictation and error correction, and software 1012 related to speech recognition. The system 1 further comprises an audio interface (I/F) 102 to receive speech, which may can be recorded by microphone 103 or received from external input 104, such as speech acquired from external systems.

The system 1 can further include one or several controllers, such as a display controller 105 for controlling the operation of a display 106, which may for instance be a Liquid Crystal Display (LCD) or other type of the displays. The display 106 serves as an optical user interface of system 1 and allows for example to present sequences of words to a user of the system 1. The system 1 can further be connected to an audio output controller 111 for controlling the operation of an audio output system 112, e.g., one or more speakers. The system 1 can further be connected to one or more input interfaces, such as a joystick controller 107 for receiving input from a joystick 108, and a keypad controller 109 for receiving input from a keypad 110. It is readily understood that the use of the joystick and/or keypad is of exemplary nature only. Equally well, a track ball, or arrow keys may be used to implement the required functionality. In addition, the display 106 can be a touchscreen display serving as an interface for receiving the inputs from the user. Furthermore, due to the ability to perform speech recognition, the system 1 may completely dispense with any non-speech related interfaces altogether. The audio I/F 102, joystick controller 107, keypad controller 109 and display controller 105 are controlled by CPU 100 according to the OS 1010 and/or the application program 1011 CPU 100 is currently executing.

Figure 1B:
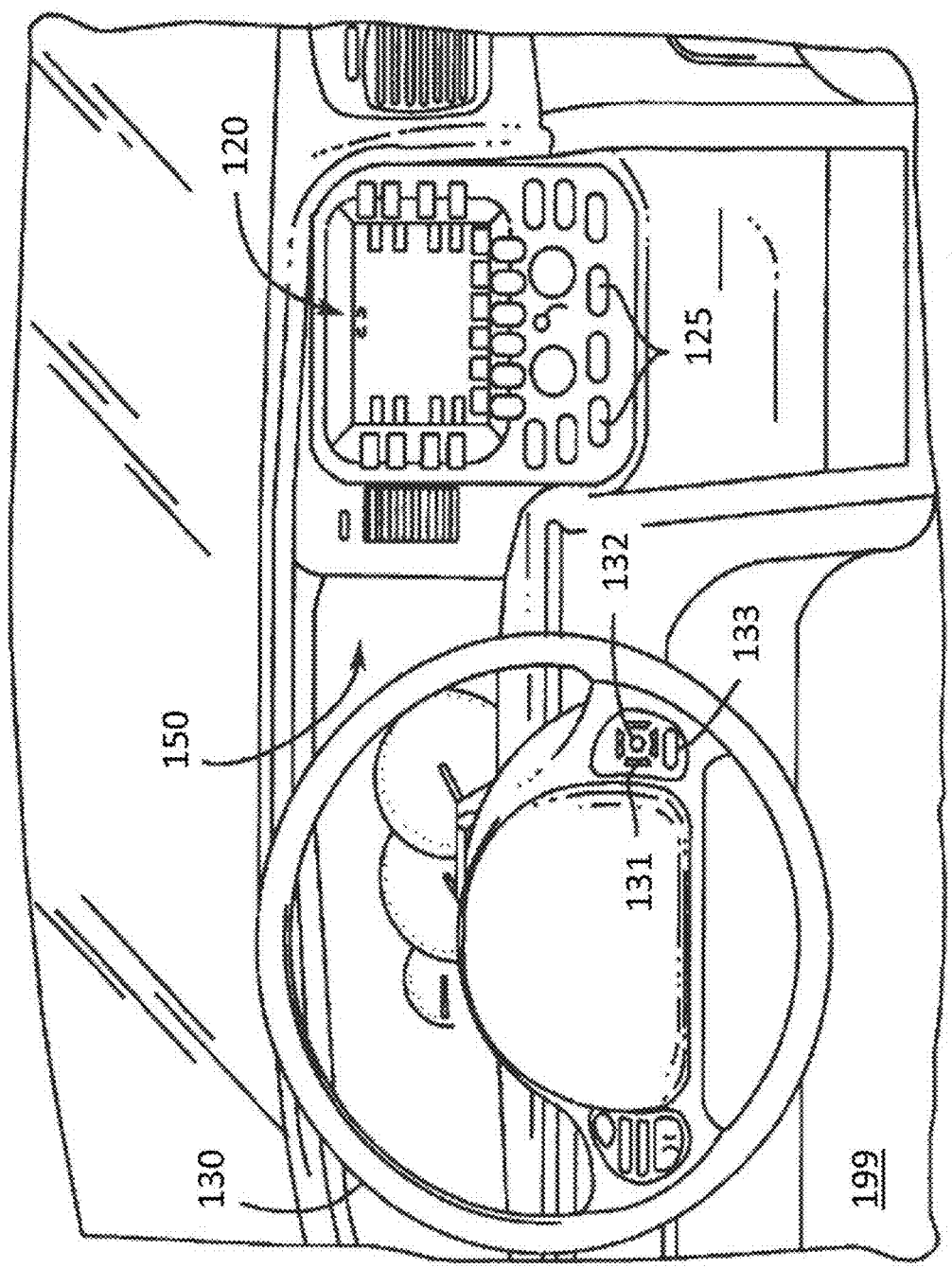
FIG. 1B is a partial front view of an instrumental panel of a vehicle including the system according some embodiments of the invention.

As shown in FIG. 1B, the system 1 can be embedded in an instrumental panel 150 of a vehicle 199. Various controls 131-133 for controlling an operation of the system 1 can be arranged on a steering wheel 130. Alternatively or additionally, the controls 125 can be place on a control module 120. The system 1 is configured to improve the interpretation of speech of the user to reduce a number of user interactions, so that the user can concentrate on operating the vehicle.

Figure 2A:
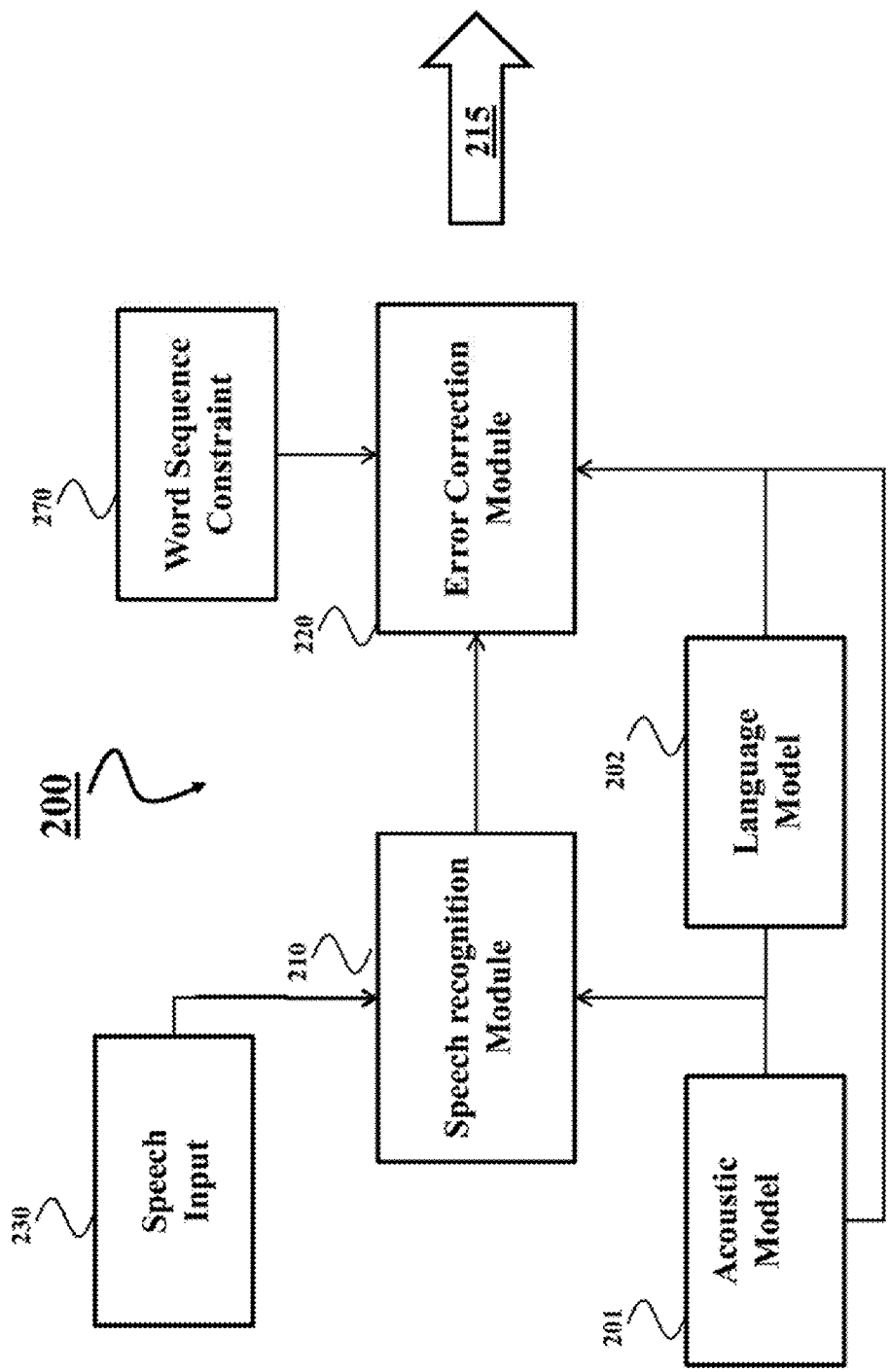
FIG. 2A is a block diagram illustrating the functionality of a speech recognition module according to one embodiment of the invention.

FIG. 2A schematically shows the functionality of a speech recognition system 200 with improved error correction capabilities according to some embodiments of the invention. The speech recognition unit 200 includes a speech recognition module 210, which can be implemented by the CPU 100 of the system 1 by executing the speech recognition software 1012 stored in the memory 101.

The speech recognition module 210 receives a speech 230, which is a spoken representation of a sequence of words (for instance a complete sentence). In various embodiments, the speech includes one or combination of audio signal, speech features, or frame-based acoustic scores. The sequence of words typically includes multiple words, e.g., three or more words.

The speech recognition module is configured to perform speech recognition of the speech 230 to determine a set of interpretations that, in the optimal case, resembles the sequence of words represented by the speech. Each interpretation in the set includes a sequence of words. The speech recognition module can use an acoustic model 201 and a language model 202.

The acoustic model 201 can for instance be stored in memory 101 of the system 1 and in one embodiment describes the conditional probabilities of sequences of acoustic features given a word sequence hypothesis, or other sequence of units representing the phonetic properties of words. The acoustic model can include phonemes or some other sound units. In some embodiments the acoustic model can include a phoneme sequence model, a model of sub-phonetic state sequences, and a Gaussian mixture model for the probability of the acoustic features given each sub-phonetic state. In other embodiments the acoustic model can include a transformation from acoustic features to phonetic state sequence probabilities that uses, for example, a neural network.

The language model 202 can also be stored in the memory 101 of the system 1 and can include statistics on the probability of a sequence of words comprising at least one word to occur in a language. The language model 202 can for instance be a uni-gram language model that is related to the likelihood of a single word to be used in a language, or a bi-gram language model that expresses a likelihood of two words of a language following each other. Also language models considering a larger number of subsequent words may be used, e.g. a tri-gram language model, etc.

In some embodiments, the speech recognition module 210 performs speech recognition by segmenting the speech into segments that are assumed to relate to single words, and then recognizes the single words, for instance by identifying phonemes in the input speech sequence segments and by comparing the phonemes to a phoneme-to-text mapping of the language model 202.

The speech recognition module 210 generally identifies a set of possible interpretations for each input speech sequence segment, where each interpretation includes a sequence of words. Interpretations are also known as recognition results. Each interpretation is associated with a recognition confidence value, e.g., a score representing correctness of an interpretation in representing the sequence of words. The score expresses a confidence of speech recognition that the recognition result is correct. For each input speech segment, the speech recognition module can determine the recognition result, e.g., a word, with the largest recognition confidence value, yielding a sequence of words that is considered to represent the input speech sequence.

Accordingly, the speech recognitions of speech are further refined by taking the language model 201 into account. Then, in addition to the recognition confidence values, a probability that a set of one or more words occurs in a language is taken into account in generating a set of interpretations of the speech using a language model and a recognition vocabulary. For example, in case of a bi-gram language model, even when a possible recognition result has a high confidence with respect to the acoustic space, e.g., "free" as opposed to "three," due to the bi-gram language model, the speech recognition module 210 may nevertheless decide for "three," using the context, for instance "at" and "o'clock" in the intended sequence of words "at three o'clock."

Figure 2B:
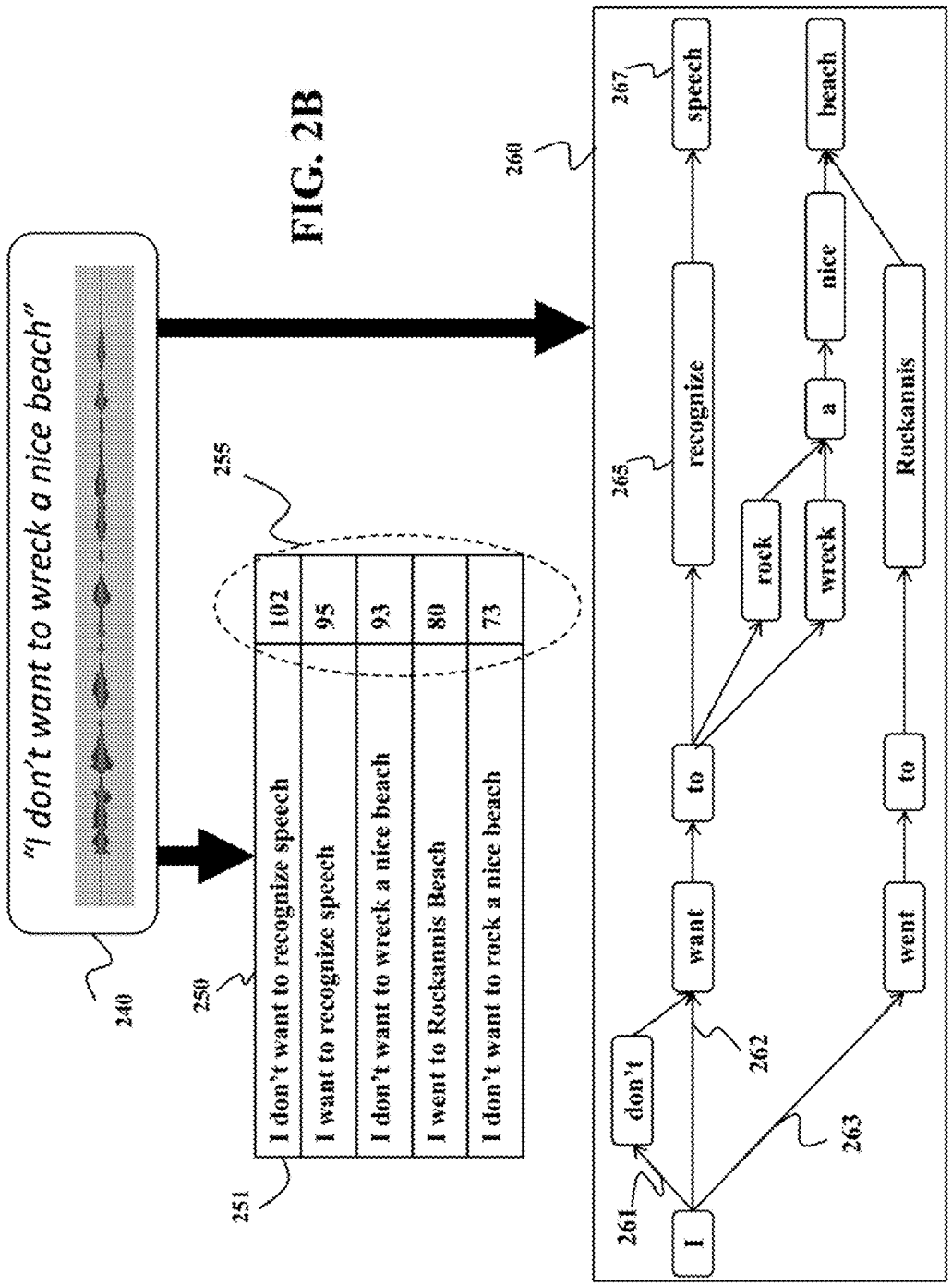
FIG. 2B is an example of steps of the method of FIG. 2A.

FIG. 2B shows examples of the set of interpretations of the speech 240. In some embodiments, the set of interpretations is determined or represented as an n-best list 250 of the speech or as a word lattice 260 of the speech. In addition, various embodiments determine, for each interpretation in the set 251, a score, e.g., the score 255, representing correctness of an interpretation subject to the word-sequence constraint. The score can be determined by a number of ways.

For example, an alternative representation of the set of interpretations is a graph known as a lattice 260, in which nodes, e.g., nodes 265 and 267, represent each hypothesized word that is identified with particular region of the speech, and occurs with a particular context. In this representation, words and word sequences that occur in the same place in many hypotheses in the n-best list can be reduced to sharing a common sub-path in the lattice. In addition to the words, the arcs of the lattice can include the acoustic and language model scores, such that the overall score for a word sequence can be derived from the scores along a path through the lattice. For example, the arcs 261, 262, and 263 can represent a score defined by corresponding probabilities of words "don't," "want" and "went" following the word "I."

In some embodiments, the speech recognition system is formulated as a probabilistic model, and the score is based on the probability of an interpretation, or sequence of words given an observed sequence of acoustic features. An interpretation can include a sequence of words, and may also identify the approximate time region of the utterance corresponding to the hypothesized word. The score $S(W|X)$ in some embodiments is based on the probability of the word sequence given the acoustic data. For example:

$$S(W|X) \propto p_\theta(W|X)$$

where $\propto$ denotes proportionality (i.e., $S(W|X)=p_\theta(W|X)c$, where c is a positive constant), $\theta$ are parameters of the model, $p_\theta$ denotes a probability measure using parameters $\theta$, $W=\{w_i\}_{i=1}^N$ the hypothesized sequence of words $w_1$, $w_2, \ldots, w_N$ in the interpretation, and $w_i$ is the word hypothesized in position i (for a hypothesis with N words). The acoustic features are denoted $X=\{x_j\}_{j=1}^T$, where $x_j$ is the jth vector of acoustic features of the utterance (for an utterance with M acoustic feature vectors). $p_\theta(W|X)$ is known as the posterior probability of W given X. In another embodiment, the score can be defined as the logarithm of this quantity:

$$S(W|X)=\log p_\theta(W|X)+k,$$

where k is an arbitrary constant.

In one embodiment, the score is separated into different sub-scores:

$$S(W|X) \propto p_{\theta_{LM}}(W)p_{\theta_{AM}}(X|W),$$

where $p_{\theta_{LM}}(W)$ is a score from a word language model with parameters $\theta_{LM}$, and $p_{\theta_{AM}}(X|W)$ is a score from an acoustic model with parameters $\theta_{AM}$. For simplicity hereafter we omit the parameters, $\theta$, except where necessary.

Another embodiment associates a word sequence with a sequence $\hat{R}=\{\hat{r}_i\}_{i=1}^N$ of hypothesized time regions of the utterance for each hypothesized word such that $\hat{r}_i$ is the position hypothesized for word $w_i$. In that embodiment the score can be based on an expanded model with an alignment term, p(R|W), such that p(W)p(X|W)=max$_R$ p(W)p(R|W)p(X|W, R). In that embodiment, $\hat{R}$ is obtained by maximizing the score over the set of all possible alignments $\mathcal{S}$:

$$\hat{R} = \underset{R \in \mathcal{S}}{\mathrm{argmax}}\, p(W)p(R \mid W)p(X \mid W, R),$$

and the acoustic score for the subsequence of features $X(\hat{r}_i)$ corresponding to region $\hat{r}_i$ associated with the hypothesized word $w_i$ is $p(X(\hat{r}_i)|w_i)$.

The language model score can be computed in many ways, including using a discrete probabilistic model, a neural network, discriminatively trained conditional random fields, and so on. For example, one embodiment formulate the probabilistic model as $$p(W) = p(w_1, w_2, \ldots, w_N) = p(w_1)\prod_{i=2}^N p(w_i \mid w_1, \ldots, w_{i-1}).$$

The probabilities are conditional on words occurring earlier in the sequence, known as the context. Typically the general model is too complex, and a simpler model known as an n-gram model is used, where the context is limited to the preceding n−1 terms:

$$p(W) = p(w_1, w_2, \ldots, w_N)$$
$$= p(w_1)\prod_{i=2}^N p(w_i \mid w_{\min(1,i-n+1)}, \ldots, w_{i-1}).$$

In some embodiments, various other parameterizations and estimation procedures are used with n-gram models to improve their ability to generalize from training data to test data.

Inference in a speech recognition model can be characterized as a search over hypotheses W to find the best scoring hypothesis, $$\hat{W} = \max_W p(W)p(X \mid W).$$

In addition typically n-best hypotheses with the largest scores are determined. The evaluation of every possible W can be computationally extensive, and some embodiments determine the n-best hypotheses using a recursive dynamic programming algorithm, e.g., as the Viterbi algorithm, combined with heuristic reduction of the search process, e.g., a beam search. Many alternative search algorithms and heuristics also exist and are employed by various embodiments.

In some embodiments, the output of the search over the hypotheses can be an n-best list 250, comprising n interpretations of the sequences of words, along with the scores of the interpretations 255, e.g., one or combination of the scores of the acoustic model and the scores of the language model.

Some embodiments provide as an output the best scoring alignment of the words with the temporal segments of the acoustic signal.

In some embodiments, the output of the search over hypotheses can be the lattice 260. Determining scores is typically more efficient in the lattice than using an n-best list. However for the clarity purposes, some embodiments are described using the n-best representation.

Although the language model and acoustic model constrain the search, the produced recognition may still have ambiguities and errors. For example, the interpretation 251 having the highest score can still be inaccurate. However, requesting the user to correct the specific interpretation 251 disregards other interpretations, which might include the correct interpretation. Also, the request to correct the specific interpretation can require multiple interactions with the user, and can distract the user from other tasks.

Some embodiments of the invention are based on a general realization that corrections of recognition results of large-vocabulary continuous speech including a sequence of words should be based on constraints for the interpretation of the entire speech. Such constraints can improve probability of interpreting the entire speech correctly, as contrasted with corrections that only modify a single word.

Accordingly, the speech recognition unit 200 also includes an error correction module 220 which reinterprets recognition results by taking the language model 202 and a word sequence constraint 270 into account. Specifically, in some embodiments, the error correction module 220 updates the score of each interpretation based on a consistency of the interpretation with the constraint 270. After the update, the interpretation 215, e.g., with the highest score, can be determined and outputted as the recognized speech.

Some embodiments are based on a realization, the constraints for interpreting the entire speech can be complemented by word-sequence constraints 270 of the speech provided, e.g., by a user uttering the speech. For example, the word-sequence constraints can include a number and order of the words in the speech, a specific word uttered at specific time in the speech, the absence of the specific word in the speech, a connection or separation of two specific words in the speech. The word-sequence constraints can also specify the topic of the speech output, for instance that the topic of the speech is pollution.

This realization allows minimizing an effort of the user to correct the speech, because the word-sequence constraints can lead to the correction of the entire interpretation of the speech, while the correction of the word can lead to the correction of that word only. Notably, the constraint 270 can be used to update the score of the entire set of the interpretation.

Thus, in some embodiments, the word-sequence constraint is used concurrently with the interpretation of the speech, as contrasted with using the constraints for subsequent correction of a portion of the speech. The best-scoring interpretations of the entire speech are determined subject to word-sequence constraints. The interpretation with the largest score can be determined as the recognized speech. In effect, such approach can minimize a number of interactions required to determine correct interpretation of the speech sequence.

Figure 3A:
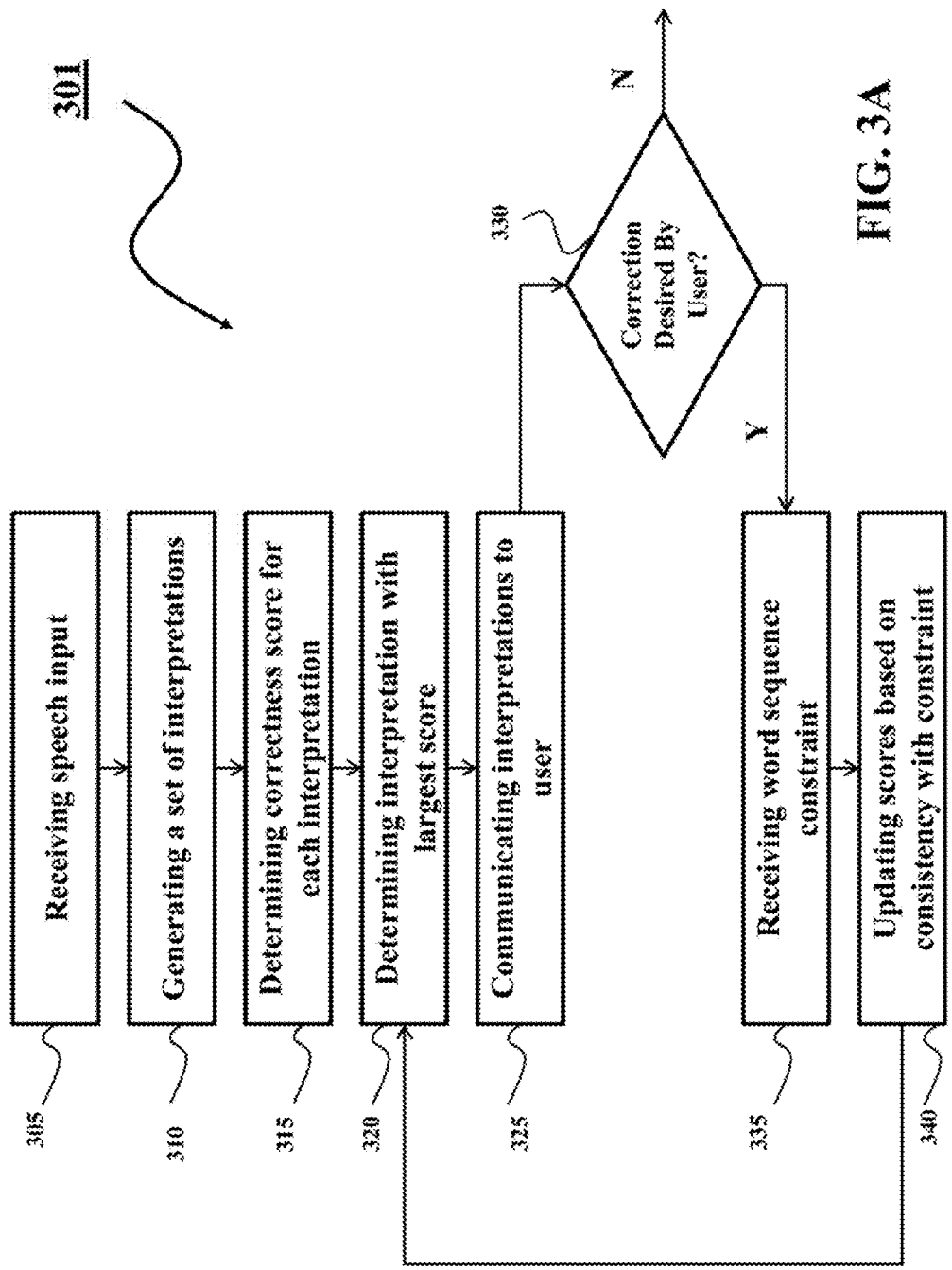

FIG. 3A shows a flow chart of a method for recognizing a speech of a user according to one embodiment of the invention. The method 300 employs some principles and realizations described above and can be implemented using a processor 301. The method receives 305 the speech representing a sequence of words and generates 310 a set of interpretations of the speech using an acoustic model and a language model.

The set of interpretations comprises one or more interpretations where each interpretation is a possible sequence of words that could have been spoken. Various embodiments receive or generate the interpretations as an n-best list of interpretations, a word-lattice, or other representation of the set of possible word sequences.

For each interpretation, the method determines 315 a correctness score for that interpretation to produce a set of scores. For example, the scores can be determined based on probabilities given by the acoustic model and the language model and/or a correctness function described below. In some embodiments, the method determines 320 the interpretations with the largest score, and communicates 325 a subset of interpretations to the user. In one embodiment, only the interpretation with the largest score is communicated to the user. In alternative embodiment, multiple interpretations are communicated.

Various embodiments use user interface components to allow the user to provide constraints for the set of interpretations if necessary. The method decides 330 whether a correction using the word sequence constraints is desired based on input from the user given through the user interface components. User can provide constrains using any interface of the system 1 or a combination thereof. For example, user can use the keypad 110, the joystick 108, the touchscreen of the display 106, a speech interface 103, and combination thereof.

When the correction is desired, the method receives 335 a constraint on the word sequence. Various embodiments receive or determine the word sequence constraint based on user interface actions through user interface components such as choice lists, buttons, etc. In some embodiments of the system, the word sequence constraints are represented as probabilities of the occurrence of various events.

In some embodiments, the word sequence constraint includes metadata of the speech, such as a number of words in the speech or absence of a specific word in the speech. The metadata of the speech is information about the word sequence as contrasted with the information related to the context of the word sequence. Such word-sequence constraints can be collected at any time.

The method updates 340 the scores of the set of interpretations of the speech according to how consistent each interpretation is with the constraint. After the scores are updated, the highest score is determined 320, and the method continues iteratively until no more corrections are desired by the user. The set of interpretations may be output from the method, e.g., stored into the memory, for being use later.

Figure 3B:
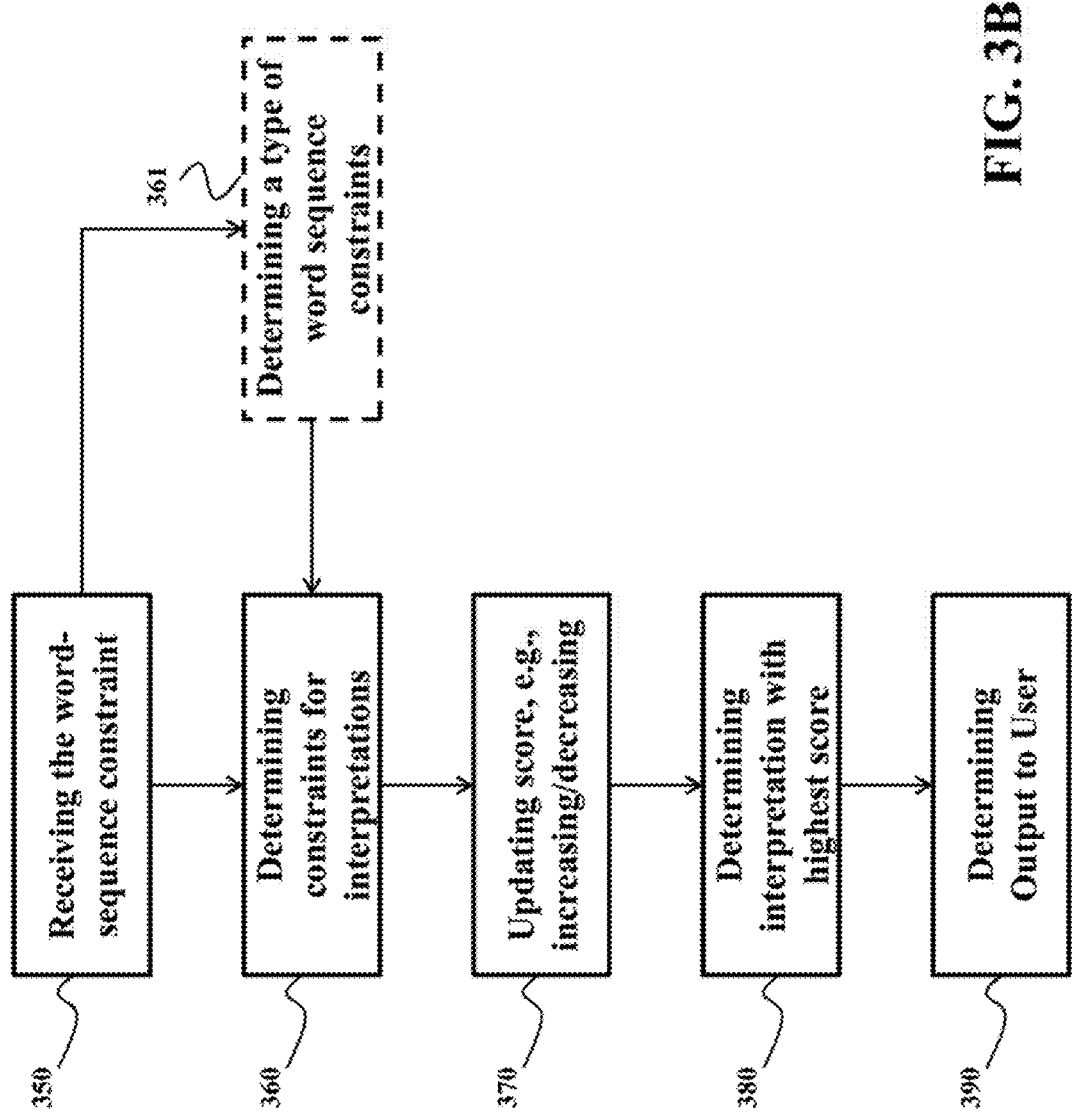

FIG. 3B shows a flowchart of a method for updating the score of the interpretation subject to constraints. The word sequence constraints are received 350 from the user. In some embodiments, the word sequence constraint is modified to determine 360 the constraints suitable for the interpretation. For example, some embodiments determine the constraints based on the word sequence constraint received from the user.

For example, in some embodiments, the word sequence constraint is received from the user in response to communicating the subset of interpretations. The embodiments determine 361 a type of the constraint based on the word sequence constraint and determine 360 the constraint based on the type. For example, the type of the constraint can be one or a combination of a language type: a constraint on the language probabilities, an acoustic type: a constraint on the probability distribution of the acoustic features given the hypothesized words, and a context type: a constraint on the word sequences within the interpretations.

Figure 3C:
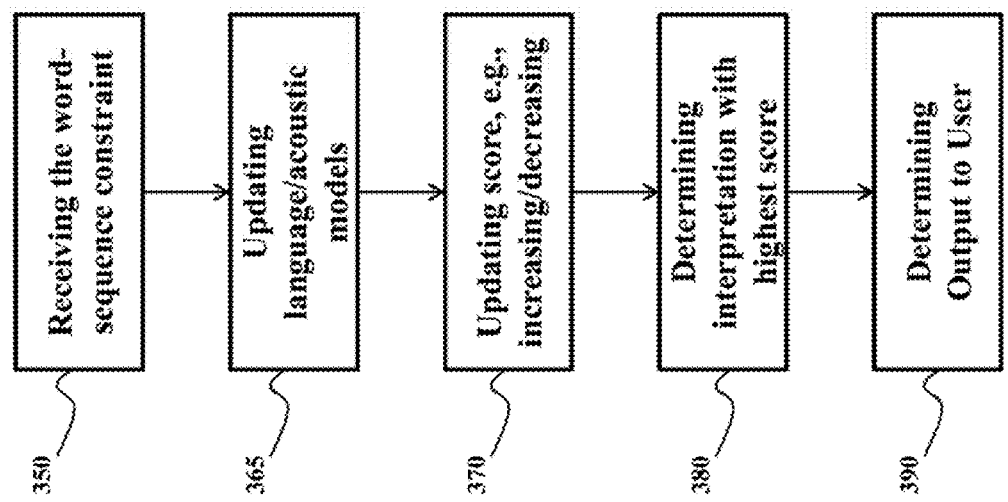

FIG. 3C shows an example of determining the constraints according to some embodiments, where the type of the determined constraints is based on the scores to be updated. Those embodiments update 365 one or combination of the language and/or acoustic models. Some embodiments determine the type of the constraint based on the word sequence constraint received from the user. For example, in some embodiments, the word-sequence constraints include metadata of the speech, such as a number of words in the speech, topic of the speech, a number of words spoken within specific period of speech. Those constraints are usually language or acoustic type constraints.

In another embodiment, the word-sequence constraints are more specific to the context of the speech. For example, the word-sequence constraints can include information about presence or the absence of a specific word in the speech. Those constraints are usually the context type constraints.

For example, if the word sequence constraint is a number of words in the sequence, in one embodiment, the updating of the scores is done by re-computing the language model scores, for example, using p(W|length(W)=6). In one variation of this embodiment, the acoustic model scores, and the estimated regions R corresponding to each word are left unchanged.

In one embodiment, the type of the constraint is the language type and the updating of the scores is done by re-computing the language model scores using a modified language model. For example, instead of the original language model $p_{\theta_{LM}}(W)$ the lattice is rescored using $p_{\theta'_{LM}}(W) = p_{\theta_{LM}}(W|\text{length}(W)=6)$. Here $\theta_{LM}$ are the original language model parameters, and $\theta'_{LM}$ are the parameters obtained by conditioning on the constraint that there are six words in the sequence. The score can thus be updated by evaluating $$S'(W|X) \propto p_{\theta'_{LM}}(W) p_{\theta_{AM}}(X|W),$$

where S'(W|X) is the modified score.

One embodiment imposes a constraint that the topic is "pollution," in a similar way. The embodiment uses a constrained language model $p_{\theta'_{LM}}(W)$ with parameters $\theta'_{LM}$ that are appropriate for word sequences on the topic of "pollution." Thus the embodiment can update the score function S'(W|X) above using the constrained language model.

Given the updated score of each interpretation, rescoring amounts to evaluating the score using the modified score function on each entry of the n-best list. Alternatively a graph of possible word sequences, based on the lattice or n-best list, can be efficiently searched using various algorithms such as the forward-backward algorithm, Viterbi decoding, or stack decoding, using the modified score function. In the process of evaluating the scores, a modified n-best list or lattice is generated.

If the constraint is only on word sequences, then the acoustic model scores, such as $p_{\theta_{AM}}(X|W)$ in the above example, and the estimated regions R corresponding to each word may be left unchanged. However, in other embodiments the type of the constraint is the acoustic type and the acoustic scores p(X|W) are changed depending on the constraints. For example, in the case where an alignment between the words and acoustic features is computed, the rescoring may also be dependent on the alignment. One embodiment defines the model p(W)p(X|W)=$\max_{R \in \mathcal{S}} p(W)p(R|W)p(X|W, R)$, and updates the scores based on constraints on R:

$$p(W)p(X|W) = \max_{R \in C} p(W)p(R|W)p(X|W, R),$$

where $\mathcal{C} \subseteq \mathcal{S}$ represents a subset of allowed alignments enforcing the desired constraint. For example, one such constraint can be that there is only one word within a particular time region.

FIG. 3D shows a flowchart of a method for determining absolute or relative constraints for updating the scores. In some embodiments, if a constraint is absolute, then the interpretation of the word sequence that does not match the constraint is rescored with a smallest possible score. Conversely, if a constraint is relative, e.g., a probabilistic, an interpretation that does not match the constraint is rescored with a smaller weight than interpretations that do match the constraint, but a non-matching interpretation may still have a final score higher than the scores of the interpretation consistent with the relative constraint.

For example, in some embodiments the relative constraints have continuous values representing different degrees of constraint satisfaction. Such constraints can be formulated using a multiplicative factor representing the constraint. In one embodiment, the constraint includes a constraint factor f(X, W, R) 369 the output of which is a number indicating the degree of constraint satisfaction for one or more of an acoustic sequence, a word sequence, and an alignment. Using this constraint factor one embodiment formulates a general re-scoring function:

$$S'(W \mid X) \propto \max_{R \in S} p(W) p(R \mid W) p(X \mid W, R) f(X, W, R).$$

Depending on the constraint factor many different kinds of constraints can be implemented, including the cases with absolute and relative constraints. For example, in some embodiments, the constraint factor can be determined using an indicator function 363 mapping the word sequence constraint specified by the user with the constraint suitable for updating the scores of the interpretation and a weight parameter 367 indicating a degree of the relative constraint (up to making the relative constraints absolute).

For example, if the constraint factor $$f(X, W, R) = f(W) = \alpha I_{length(W)=6} + \beta,$$

where the notation f(W) indicates that the constraint factor does not depend on X and R in this case, $\alpha$ and $\beta$ are a non-negative weight parameters representing the degree of constraint satisfaction, and, for example, $$I_{length(W)=6} = \begin{cases} 1, & length(W) = 6 \\ 0, & otherwise \end{cases},$$

is an indicator function for the constraint that there are six words in the sequence. If weight parameter $\alpha$ is large relative to $\beta$ then the constraint satisfaction is strong, otherwise the constraint is weak. An absolute constraint may be achieved by setting $\beta$ to zero so that the function f(W) has zero value in all cases that are not desired.

In another embodiment, a constraint on the alignment can be implemented using $f(X, W, R) = f(R) = \alpha I_{R \in \mathcal{C}} + \beta$, where $I_{R \in \mathcal{C}}$ is an indicator function for the condition that R is in the constraint set $\mathcal{C}$.

In the case with the constraint embodied in a constrained language model $p_{\theta'_{LM}}(W)$ with parameters $\theta'_{LM}$, the constraint factor is $$f(X, W, R) = \frac{p_{\theta'_{LM}}(W)}{p(W)},$$

where p(W) is the language model used in the initial recognition. This has the same effect on the scores as substituting the new model $p_{\theta'_{LM}}(W)$ for the old one p(W).

Note that after rescoring, the absolute scale of f does not influence the relative scoring of different word hypotheses, so that any other constraint factor proportional to another, $f'(X, W, R) \propto f(X, W, R)$, produces the same effect on the resulting n-best list or lattice.

Additionally or alternatively, multiple constraints for the interpretation can be determined based on the word sequence constraint received from the user. For example, if the user indicated that a word in the word sequence is correct, some embodiments determine that the words at the left or at the right of the word (depending on the language model) are correct as well. In those embodiments, additional constraints for neighboring words are generated.

For example, in one embodiment, the scoring function tests for presence of the specific word. For example, a direction of the speech can be determine based on the language model, and the scoring function is updated with a test for presence of the words preceding and following, according to the direction of the speech, the specific word in the interpretation communicated to the user. In this embodiment, the scoring function test not only for the specific word, but also for other words neighboring the word from the direction of the speech.

After the constraint for interpretation is determined, the scores of some interpretations are updated 370 based on a consistency of a specific interpretation with the constraint. In some embodiments, each interpretation is updated, such that the score of each interpretation may be either increased or decreased. That means that after the update 370, the score of each interpretation may be either increased or decreased. Some variations of the embodiments allow the score of some interpretations to remain unchanged.

After the scores are updated, the interpretations with the largest score are determined 380, and the output to the user is formed 390 and communicated to the user. Some embodiments communicate the interpretations using visual means such as words and characters shown on a display. Some embodiments communicate the interpretations using audio feedback such as sounds produced from a speaker using Text-to-speech or recorded audio waveforms. Various embodiments may communicate one or multiple interpretations with the best scores.

Figure 4:
FIG. 4 is a schematic of a sequence of words with an emphasized word according to one embodiment of the invention.
Figure 5:
FIG. 5 is a schematic a sequence of words with two emphasized words according to one embodiment of the invention.
Figure 6:
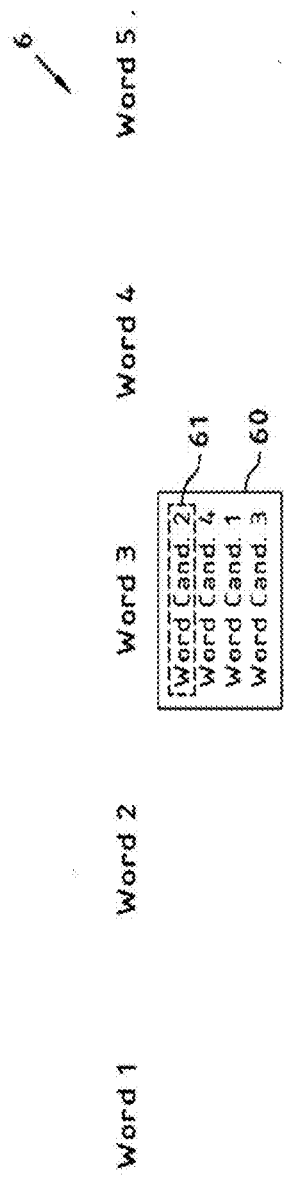
FIG. 6 is a schematic a sequence of words and a sorted set of word candidates according to one embodiment of the invention.

FIGS. 4, 5 and 6 show examples of interfaces for selecting the word-sequence constraint based on interpretations communicated to the user of the speech. The interpretation can be an initial interpretation of the speech, or subsequent interpretations chosen after updating the scores.

The sequence of words 4 is a sentence that comprises five words, wherein the third word (Word3) is furnished with an emphasizing dashed frame 40. In another embodiment, the Word3 is determined as a most efficient constraint for the word-sequence.

Furthermore, in the example of FIG. 4, the dashed frame 40 is not only meant for emphasizing, but also represents a selector, which can be moved by a user in order to select words that are erroneously recognized and thus need correction. Such movement may for instance be performed word-by-word by means of a joystick or by arrow keys, and selection then may be performed by pressing a dedicated button or key (which may for instance be integrated into or implemented by said joystick or touch screen).

FIG. 5 shows an alternative interface, where user can select one or multiple words, e.g., Word3 and Word5. After selecting a word or word sequence, the user can perform one of the following actions: marking the selected word or sequence as correct, marking one or more of the selected word or sequence as incorrect, skipping the selected word or sequence, requesting additional choices for the selected word or sequence, or possibly altering some other constraints such as the subject matter or style of the text.

In one embodiment, after a word or word sequence is selected, the time or time window associated with the selected word can be used to retrieve the set of words that could have been spoken at that time or time window, and some or all of these are displayed to the user, preferably ranked in order of decreasing scores.

FIG. 6 exemplifies a scroll-down list 60 for the third word (Word3) of a sequence of words 6. The scroll-down list 60 includes four word candidates, selected based on the time window corresponding to the word3. A selector 61 is automatically placed on the first entry in said scroll-down list 60, which can be vertically moved to selected entries from said scroll-down list 60.

EXAMPLES

Figure 7A:
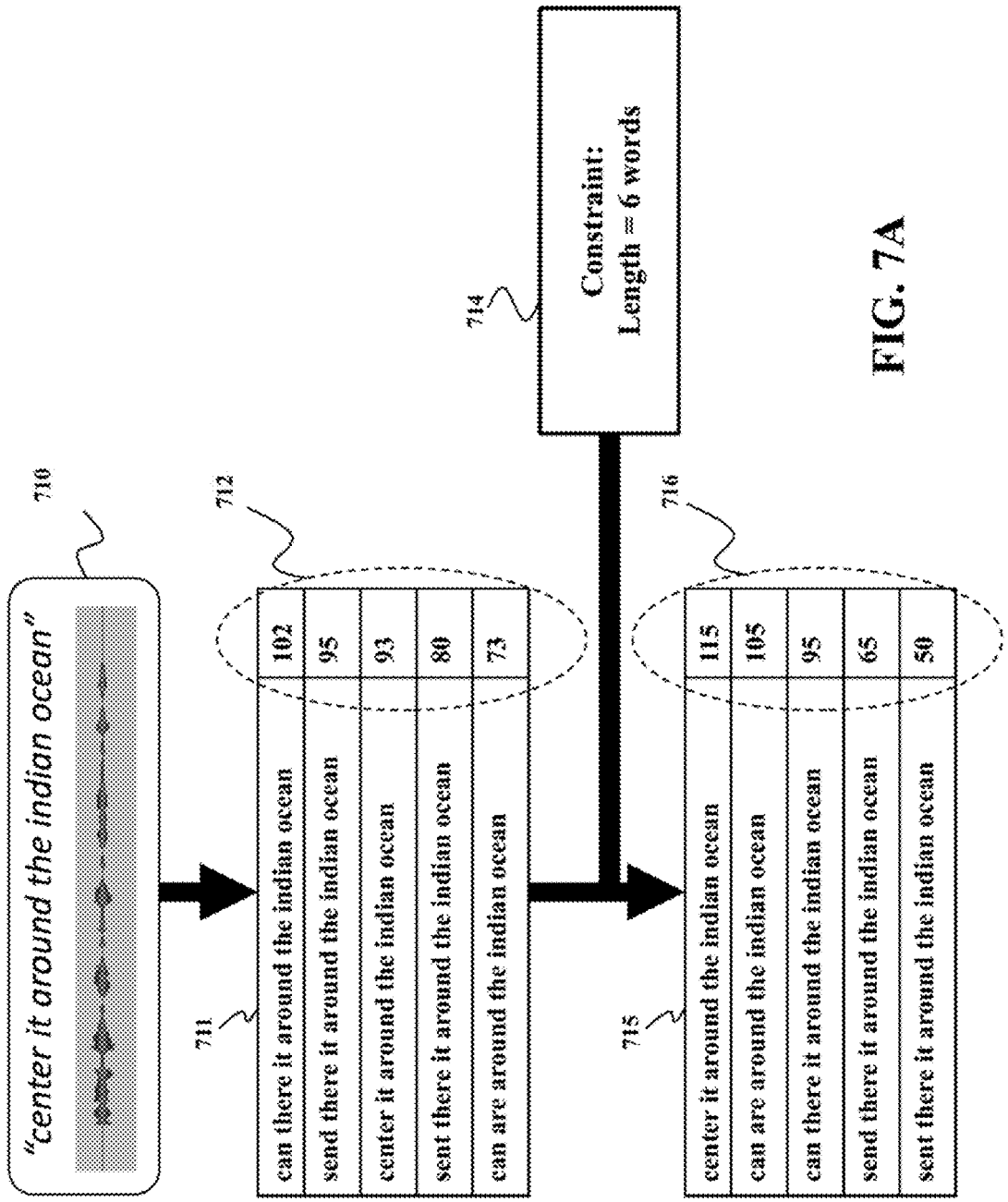
FIGS. 7A, 7B, and 7C are schematics of exemplar embodiments of the invention.

FIG. 7A shows a schematic of an exemplar method for interpreting speech 710 subject to word sequence constraint according to one embodiment of the invention. In this example, the word-sequence constraint includes a constraint 714 on a number of words, i.e., that the speech has six words. Notably, the constraint 714 is used to update the score 712 of the entire set of interpretations 711 to produce an updated set 715 with updated scores 716 of the interpretations. As can be seen from the example of FIG. 7A, the scores 716 for the entire set of the interpretations are updated.

For this exemplar embodiment, the general rescoring function $$S'(W \mid X) \propto \max_{R \in S} p(W)p(R \mid W)p(X \mid W, R)f(X, W, R),$$

may be used as described above, with a specific constraint factor $f(X, W, R)$ which gives higher weight to sequences with six words, such as $$f(X, W, R) = f(W) = \alpha I_{length(W)=6} + \beta,$$

and $$I_{length(W)=6} = \begin{cases} 1, & length(W) = 6 \\ 0, & otherwise \end{cases}.$$

Other constraint factors and/or indicator functions can also be used.

Figure 7B:
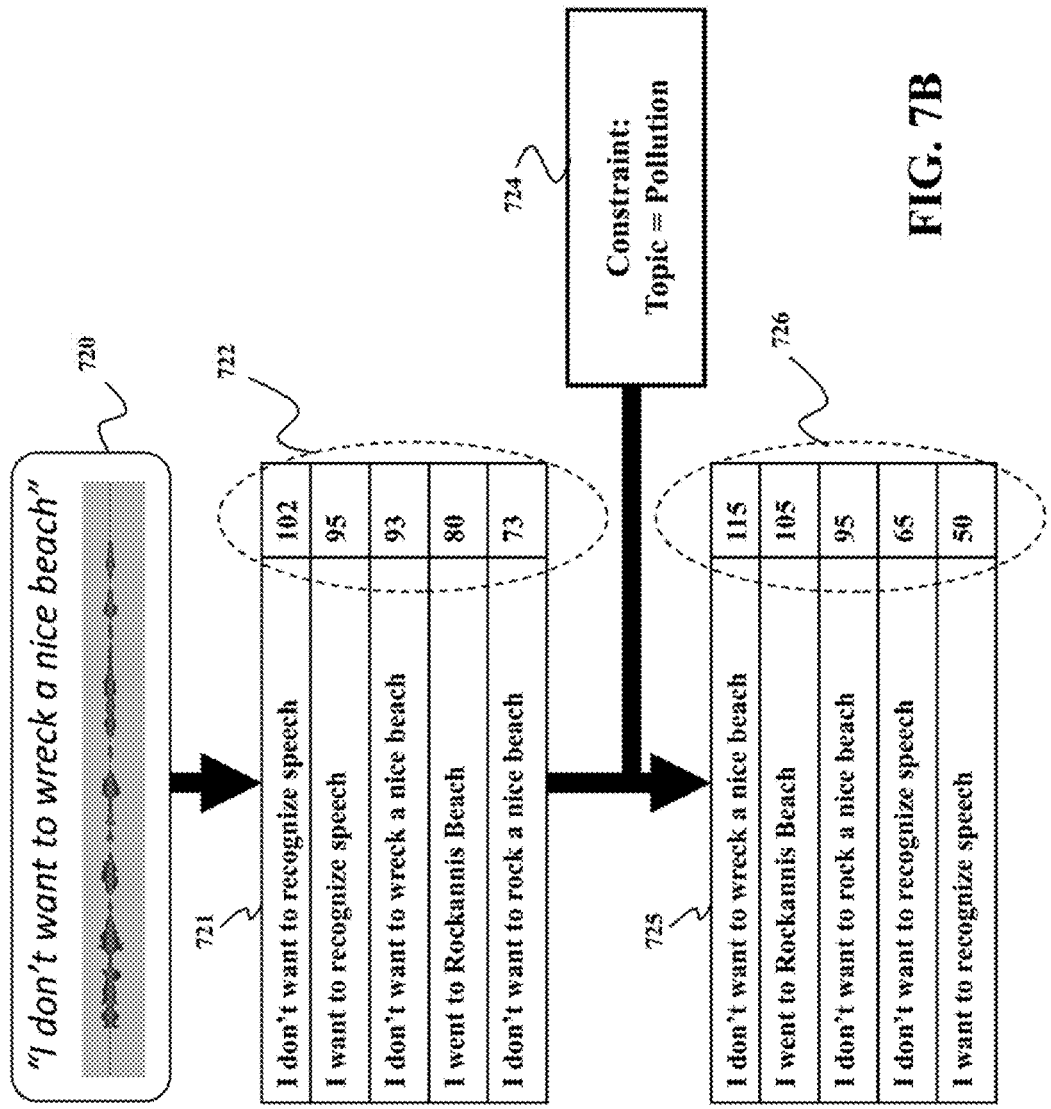

FIG. 7B shows a schematic of an exemplar method for interpreting speech 720 subject to word sequence constraint according to one embodiment of the invention. In this example, the word-sequence constraint includes a constraint 724 on a topic of the speech, i.e., that the speech is about the pollution. The constraint 724 is used to update the score 722 of the entire set of the interpretation 721 to produce an updated set 725 with updated scores 716 of the interpretations.

This exemplar embodiment uses a constrained language model $p_{\theta'_{LM}}(W)$ with parameters $\theta'_{LM}$ that are appropriate for word sequences on the topic of "pollution." Thus the embodiment can update the score function $S'(W|X)$ above using the constrained language model.

Figure 7C:
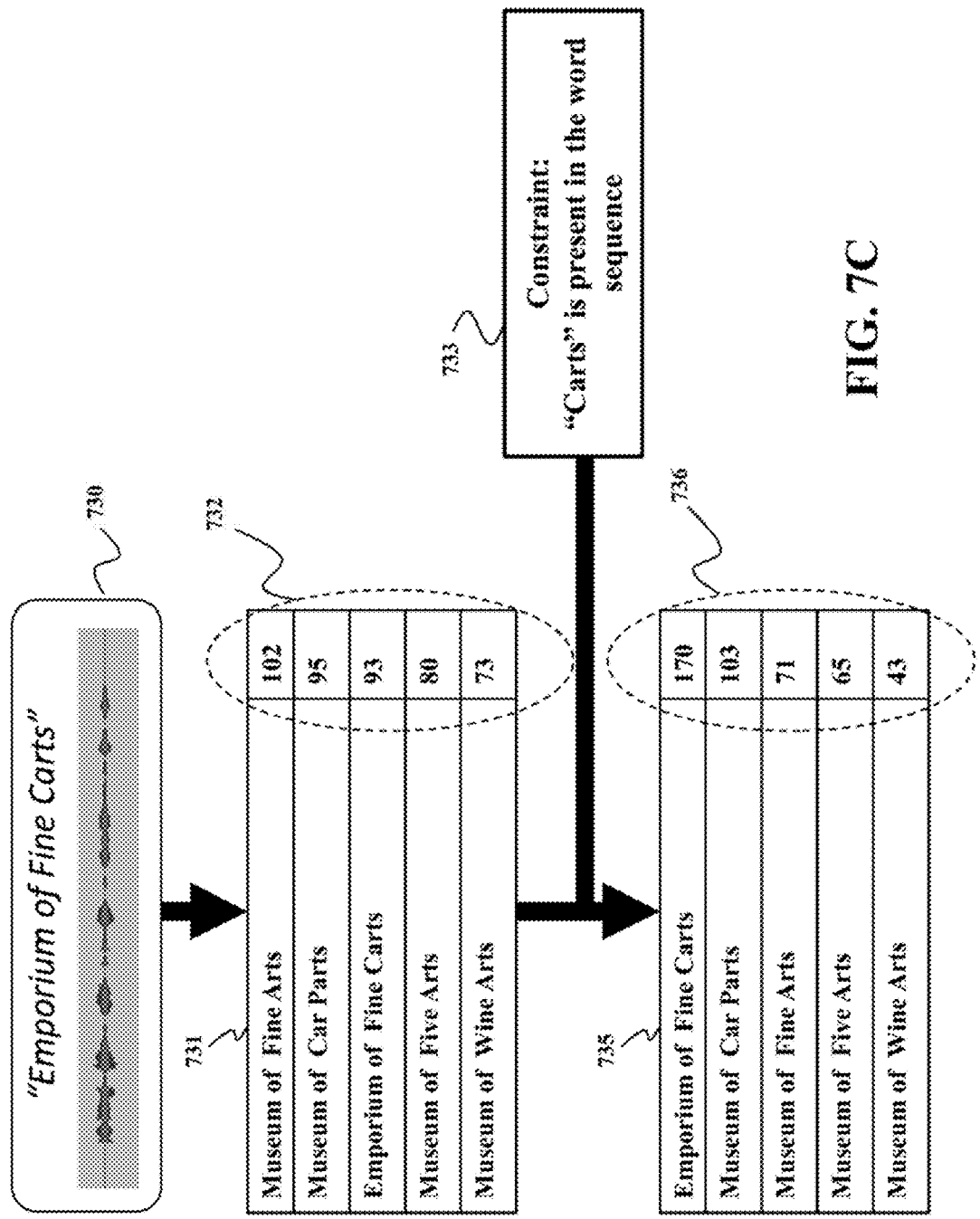

FIG. 7C shows a schematic of an exemplar method for interpreting speech 730 subject to word sequence constraint according to one embodiment of the invention. In this example, the word-sequence constraint includes a constraint 734 on a presence of the specific word "Carts" in the speech. The constraint 734 is used to update the score 732 of the entire set of the interpretation 731 to produce an updated set 735 with updated scores 736 of the interpretations.

For this exemplar embodiment, the general rescoring function $$S'(W \mid X) \propto \max_{R \in S} p(W)p(R \mid W)p(X \mid W, R)f(X, W, R),$$

may be used as described above, with a specific function $f(X, W, R)$ which gives higher weight to sequences that include the word "Carts", such as $$f(X, W, R) = f(W) = \alpha I_{carts \in W} + \beta,$$

and $$I_{carts \in W} = \begin{cases} 1, & carts \in W \\ 0, & otherwise \end{cases}.$$

Other constraint factors and/or indicator functions can also be used.

Determining Word Sequence Constraint for Low Cognitive Speech Recognition

Some embodiments are also based on recognition that in order for the system to impose a low cognitive load on a user, the method(s) of entry of word sequence constraints should minimize the actions of the user required for selection of the constraints. The word-sequence constraints can have different values, but also can have different types. For example, the types of the word-sequence constraints can include selection or rejection of a word, selection of the sequence of word, selection of a timeslot, a trace of correct words in the sequence, replacement of words or order of words, etc. Accordingly, it is desired to provide an interface adapted for selection of both type and value of the constraints with minimal destruction of the users from their primary task, such as driving.

Some embodiments of the invention are based on a realization that a single gesture of the user can be analyzed to determine both the type and the value of the word-sequence constraints. Specifically, a type of the gesture can be used to determine a type of the word-sequence constraint, and a path of the gesture with respect to the interface, e.g., a location of the path on a display device, can be used to determine the value of the word-sequence constraint.

Figure 8:
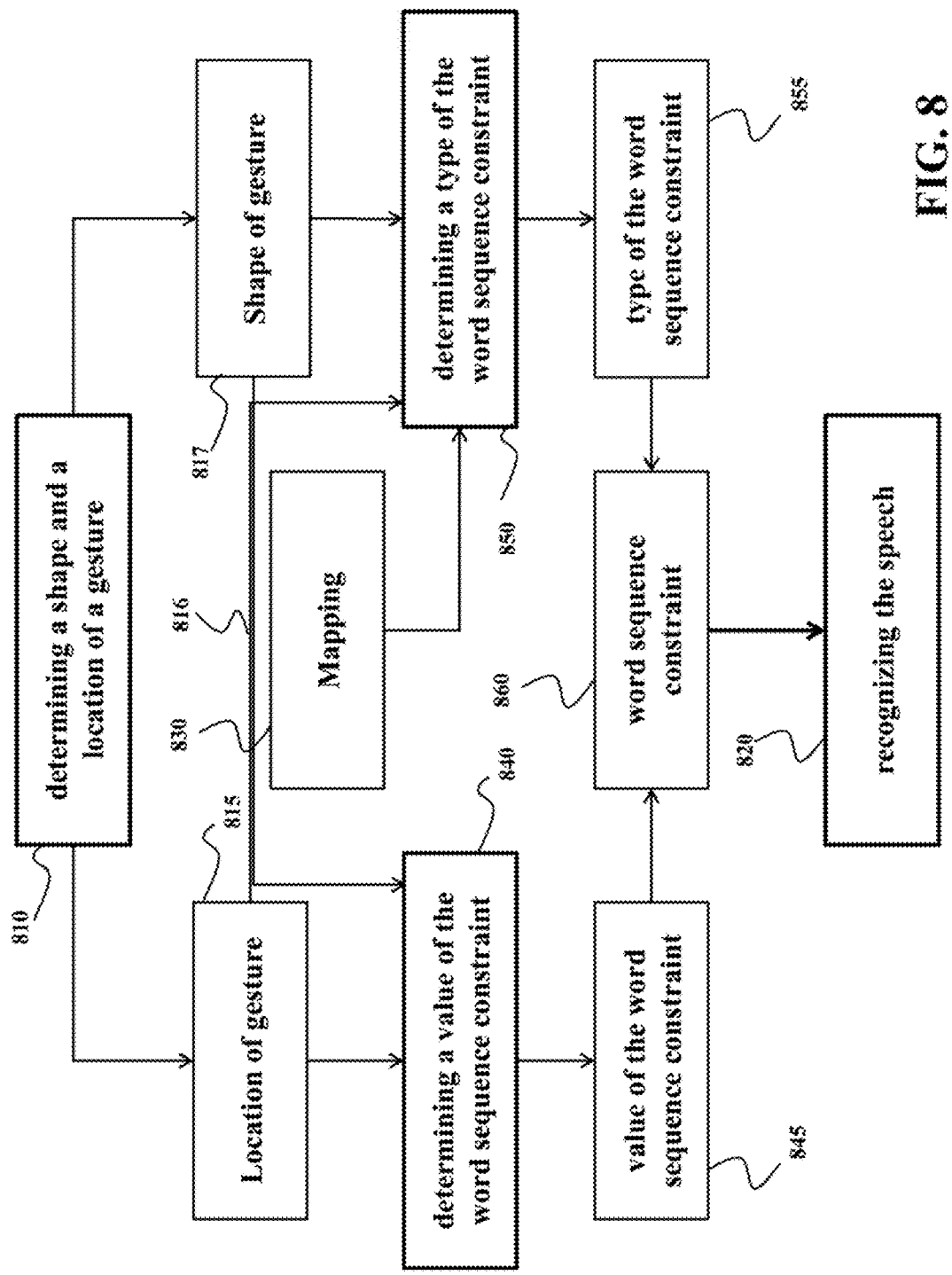
FIG. 8 is a block diagram of a method for recognizing speech including a sequence of words according to one embodiment of the invention.

FIG. 8 shows a block diagram of a method for recognizing speech including a sequence of words according to one embodiment of the invention. The embodiment determines 810 a shape 817 of a gesture and a location 815 of the gesture with respect to a display device showing a set of interpretations of the speech.

FIG. 9A shows an example of a shape 901 of a gesture made by a user on an input device. For example, the input device can represent the path of the gesture as a sequence of location coordinates 904 within the coordinate space of the input device.

In a touch device, the coordinate sequence is within a 2D plane of the touch surface. In a 3D freehand gesture device, the coordinate sequence is within a 3D space of motion as measured by the device. The shape of the gesture is formed by the locations of these coordinates relative to each other and can include geometric patterns that are minimally affected by the transformations such as scaling and/or rotation. In some embodiments, the sequence of location coordinates is ordered and the shape of the gesture includes dynamics of formation of the gesture, such as in the grab gesture or zoom in or zoom out gestures.

FIG. 9B shows a location 903 of the gesture having the shape 901 on a display device 902. The location of the gesture can be absolute or relative. For example, the absolute location can be determined as a location of a geometrical center of the gesture, or a location of a circle circumscribing the shape of the gesture. In alternative embodiments the location of the gesture can be mapped into the coordinate space of the display of UI elements and can be determined relative to the elements displayed on the UI of the input device. For example, the location 903 can be determined relative to the set of interpretations displayed on the device 902. In the example of FIG. 9B, the location of the gesture is determined as the closest to the element 905.

In some embodiments the location of the gesture includes a set of locations of geometrically significant points of the shape of the gestures, such as corners of the shape corresponding to a change of the direction of the gesture. Additionally or alternatively, the significant points can include a point closest to a particular UI element, i.e., the point of the gesture closest to a word of the interpretation of the speech.

Next, the embodiment determines 850 a type of the word sequence constraint 860 based on the shape of the gesture and a mapping 830 between a set of shapes of gestures and a set of types of word sequence constraint. In some embodiments the mapping 830 is predetermined and stored in a memory, such as the memory 101. Additionally or alternatively, the mapping 830 can be determined or updated during the operation of the speech recognition system.

The embodiment also determines 840 a value 845 of the word sequence constraint 860 based on the location of the gesture 815 and the shape of the gesture 817 and recognizes 820 the speech using the word sequence constraint 860. For example, a horizontal gesture can be mapped to the type of the word-sequence constraint of selecting a sequence of words. The location of the path of this gesture on the input device is mapped into a location in the coordinate space of the user interface, which can be used to determine the sequence of words present in the interpretation of the speech. Similarly, the vertical gesture can be mapped to the type of selecting a timeslot of the words, and the location of the path of this gesture on the input device can be mapped into a corresponding location of the gesture in user interface space, which can be used to determine time and/or order of utterance of the specific words.

In the similar manner, different shapes of the gestures like flick, circle, drag selection and trace of the word path can be mapped to the different types of the constraints and the location of the gesture in the space of UI elements device can be used to determine the value of the constraint for subsequent rescoring of the possible interpretations of the speech.

Both the shape and location of the gesture can be represented as a single best choice, or as a probabilistic list of possibilities of shapes and locations associated with scores. In addition, in some embodiments, the shape and the location of the gesture can be updated 816 based on probability of their joint correspondence. For example, if the shape of the gesture can be interpreted as remove a word or select a sequence of words, but the location of the gesture related to a single word only, the probability of the shape of the gesture corresponding to the removing a word can be increased.

Figure 9C:
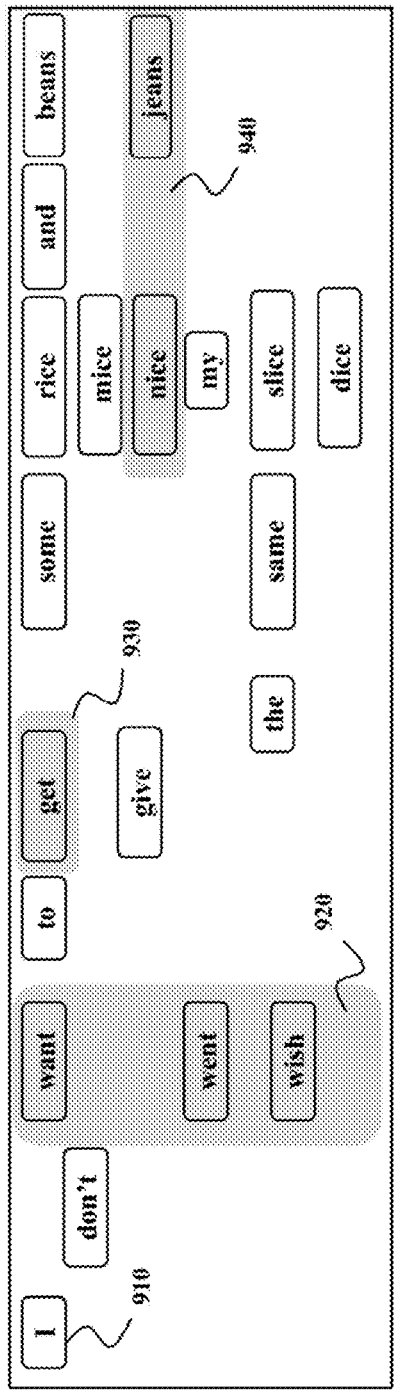
FIGS. 9C and 9D are examples of human machine interfaces for displaying and specifying the word-sequence constraints according to some embodiments of the invention.

FIG. 9C shows an exemplar human machine interface (HMI) shown for a display device 902 for displaying and specifying the word-sequence constraints according to one embodiment of the invention. In this embodiment, words that have relatively high current correctness scores according to the speech input and the current word-sequence constraints are shown in a multidimensional visualization. There is a specific visual interface element 910 for each word candidate shown. The interface element 910 can represent a word, a character, a phoneme, or a word sequence. In this example, the horizontal dimension represents time and the vertical dimension represents the score of each element, with elements having a higher score towards the top of the visualization.

Elements that are above/below each other are alternate possibilities for something that could have been said during the same part of the speech utterance, and the best (most likely) interpretation of the utterance can be read across the top of the visualization. FIG. 8 shows several kinds of selections that can be made in order to specify the word sequence constraint. A single word selection 930 in the word sequence can be shown to the user, e.g, by highlighting the interface element using color, background shading or other visual information. A word sequence selection 940 selects a sequence of words. A time-slice selection 920 selects a time bounded section of the utterance and refers to all possible words that could have been said during that time section.

The HMI can be implemented using different kinds of display devices 902 such as a heads-up or wearable display with a gesture input device, or a display screen with direct touch such as a touchscreen. Other combinations of visual output and touch, mouse or gesture input are possible. In any case, the embodiment maps particular gesture shapes either to particular kinds of constraints, or to actions to select a word 830, a word sequence 840, and/or a time-slice 820. After a particular element is selected, further interface actions impose word-sequence constraints upon the selected element or elements.

In some embodiments, some gestures may be segmented into separate gesture segments which may be analyzed separately for shape and location information.

Figure 9D:
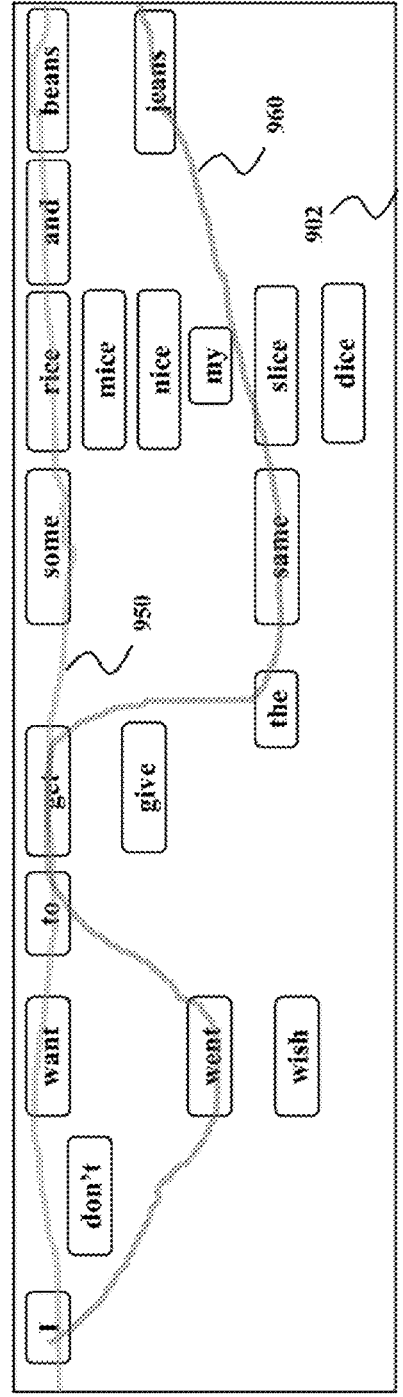

FIG. 9D shows an example of a specific type of action that allows the user to prefer one particular interpretation of the utterance and to provide the word sequence constraint for that interpretation. The display device 902 provides a user with an ability to trace a curve through the interface elements representing correct words. FIG. 9D shows examples of the two different traces. The trace 950 represents the interpretation "I want to get some rice and beans," and the trace 960 represents the interpretation "I went to get the same jeans."

Gesture and touch traces are both ambiguous and noisy, so the touch/gesture trace can be converted to a probability $p(Z|V, W)$, where Z is the path of the gesture, V is the layout of the visual elements on the display device, and W is the word sequence in the interpretation. This formulation combines the trace with the language model and acoustic scores to update the correctness scores so that the score for interpretations that are both consistent with the trace and the language model are increased.

Accordingly, some embodiments determine a constraint factor indicating a degree of consistency with the word sequence constraint. The constraint factor can be used for determining a scoring function based on the constraint factor and updating the set of scores using the scoring function.

For example, given trace 960, there are several possibilities for the best choice at the time slice which includes the words {nice, my, slice, . . . }. The trace appears to have been closest to "slice", but this would result in "I went to get the same slice jeans", which is a poor match for the language model. In this case, the highest scoring interpretations after combination of the trace constraint and the language model constraints might be "I went to get the jeans", and "I went to get the nice jeans".

Figure 10:
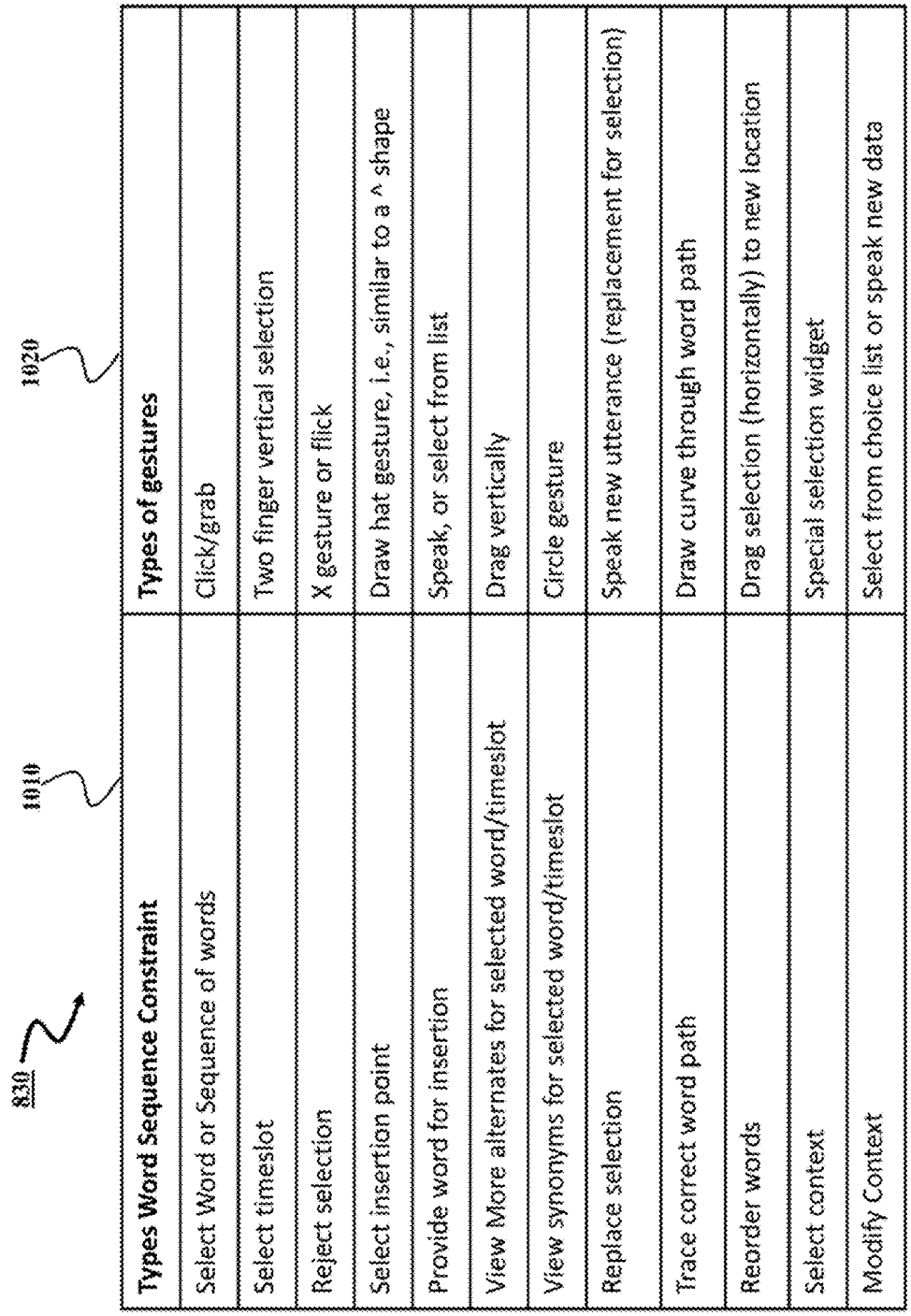
FIG. 10 is an example of the mapping between a set of shapes of gestures and a set of types of word sequence constraint according to some embodiments of the invention.

FIG. 10 shows an example of the mapping 830 between a set of types of gestures 1020 and a set of types of word sequence constraint 1010. In general, the location of the touch/gesture action provides context about what is to be selected or where the constraint is to be imposed. For example, making an "X" gesture over a word in the visualization V might map to rejecting a word (reducing its score to very low value).

In some embodiments the types of the word sequence constraint determine the types of the constraint factor. Those embodiments determining the constraint factor based on the type of the word sequence constraint. For example, in one embodiment the mapping 830 includes the gesture of a horizontal selection, and corresponding the constraint factor outputs a number indicating a degree of consistency with a word sequence. In another embodiment the mapping 830 includes the gesture of a trace of a correct word sequence, and corresponding the constraint factor outputs a number indicating a degree of consistency with the trace.

For example, in one embodiment, $f(X, W, R) = f_{Z,V}(W)$ where $f_{Z,V}(W)$ is a constraint factor outputting a number indicating a degree of consistency of a word sequence with the trace and visualization. For example, $f_{Z,V}(W)$ may be proportional to $p(Z|V, W)$.

Given a gesture G which is mapped to a constraint, $f(X, W, R) = f_{G,V}(W)$ where $f_{G,V}(W)$ is a constraint factor outputting a number indicating a degree of consistency of a word sequence with the gesture and visualization. For example, $f_{G,V}(W)$ may be proportional to $p(G|V, W)$.

In the example of the rejection gesture, let $w_{rej}$ be a word that the user has rejected. Then, $$f_{G,V}(W) = \begin{cases} 0, & \text{if } W \text{ contains } w_{rej} \\ 1, & \text{otherwise.} \end{cases}$$

Additionally or alternatively, in some embodiments the mapping includes one or combination of a select constraint corresponding to a grab gesture, a sequence constraint corresponding to a horizontal gesture, a synonyms constraint corresponding to a circle gesture, a trace constraint corresponding to a trace a path gesture, an intersection constraint corresponding to a hat gesture, a reorder constraint corresponding to a trace a drag gesture.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output systems. These systems can be used, among other things, to present a user interface. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other systems. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for recognizing speech including a sequence of words, comprising:
    displaying a set of interpretations of the speech on a display device, such that elements in the set of interpretations are displayed at corresponding locations on the display device;

determining a shape of a gesture and a location of the gesture with respect to the display device showing the set of interpretations of the speech;

determining a type of a word sequence constraint based on the shape of the gesture and a mapping between a set of shapes of gestures and a set of types of word sequence constraint;

determining a value of the word sequence constraint based on the location of the gesture relative to the locations of the elements in the set of interpretations on the display device; and recognizing the speech using the type and the value of the word sequence constraint, wherein steps of the method are performed by a processor.

2. The method of claim 1, further comprising:

generating the set of interpretations of the speech using an acoustic model and a language model;

determining, for each interpretation, a score representing correctness of an interpretation in representing the sequence of words to produce a set of scores;

rendering the set of interpretations of the speech on the display device;

determining a constraint for recognizing the speech based on the type and the value of the word sequence constraint; and updating the set of scores based on a consistency of each interpretation with the constraint.

3. The method of claim 2, further comprising:

determining a constraint factor indicating a degree of consistency with the word sequence constraint; and determining a scoring function based on the constraint factor; and updating the set of scores using the scoring function.

4. The method of claim 3, further comprising:

determining the constraint factor based on the type of the word sequence constraint.

5. The method of claim 4, wherein the scoring function $S'(W|X)$ is $$S'(W|X) \propto \max_{R \in \mathcal{S}} p(W)p(R|W)p(X|W,R)f(X,W,R),$$

wherein $\propto$ denotes proportionality, $W=\{w_i\}_{i=1}^{N}$ is a sequence of N words $w_1, w_2, \ldots, w_N$ in the interpretation, and $w_i$ is a word hypothesized in a position i, $X=\{x_j\}_{j=1}^{T}$, denotes acoustic features of the acoustic model, where $x_j$ is an jth vector of the acoustic features of the speech input and T is the number of acoustic feature vectors, a function $p(.|..)$ is a probability, $\mathcal{S}$ is a set of possible alignments, $R=\{r_i\}_{i=1}^{N}$ is a set of hypothesized time regions of the speech for each hypothesized word, such that $r_i$ is the position hypothesized for word $w_i$ and $f(X, W, R)$ is the constraint factor.

6. The method of claim 5, wherein the gesture includes a horizontal selection, and wherein the constraint factor outputs a number indicating a degree of consistency with a word sequence.

7. The method of claim 5, wherein the gesture includes a trace of a correct word sequence, and wherein the constraint factor outputs a number indicating a degree of consistency with the trace.

8. The method of claim 1, wherein the mapping includes a select constraint corresponding to a grab gesture.

9. The method of claim 1, wherein the mapping includes a timeslot constraint corresponding to a vertical gesture.

10. The method of claim 1, wherein the mapping includes a sequence constraint corresponding to a horizontal gesture.

11. The method of claim 1, wherein the mapping includes a rejection constraint corresponding to a flick gesture.

12. The method of claim 1, wherein the mapping includes a synonyms constraint corresponding to a circle gesture.

13. The method of claim 1, wherein the mapping includes a trace constraint corresponding to a trace a path gesture.

14. The method of claim 1, wherein the mapping includes an insertion constraint corresponding to a hat gesture.

15. The method of claim 1, wherein the mapping includes a reorder constraint corresponding to a trace and drag gesture.

16. A system for recognizing speech including a sequence of words, comprising:

a display device for displaying a set of interpretations of the speech, such that elements in the set of interpretations are displayed at corresponding locations on the display device, and for receiving, in response to the displaying, a gesture with respect to the display device; and at least one processor for determining a type and a value of a word sequence constraint based on a shape of the gesture and a location of the gesture relative to the locations of the elements from the set of interpretations on the display device and for recognizing the speech using the type and the value of the word sequence constraint.

17. The system of claim 16, wherein at least one processor includes a processor implementing a speech recognition module and an error correction module, wherein the speech recognition module generates the set of interpretations of the speech input using an acoustic model and a language model, and determines, for each interpretation, a score representing correctness of an interpretation in representing the speech; and wherein the error correction module determines, using the type and the value of the word sequence constraint, a constraint for recognizing the speech, and updates the score of each interpretation based on a consistency of the interpretation with the constraint.

18. The system of claim 17, wherein the system for recognizing the speech is embedded in an instrumental panel of a vehicle.

19. The system of claim 16, wherein at least one processor determines the type of the word sequence constraint based on the type of the gesture and a mapping between a set of types of gestures and a set of types of word sequence constraint.

20. The system of claim 19, wherein the mapping includes a select constraint corresponding to a grab gesture, wherein the mapping includes a timeslot constraint corresponding to a vertical gesture, wherein the mapping includes a sequence constraint corresponding to a horizontal gesture, wherein the mapping includes a rejection constraint corresponding to a flick gesture, wherein the mapping includes a synonyms constraint corresponding to a circle gesture, wherein the mapping includes a trace constraint corresponding to a trace a path gesture, wherein the mapping includes an insertion constraint corresponding to a hat gesture, and wherein the mapping includes a reorder constraint corresponding to a trace and drag gesture.

* * * * *